US010667472B2

(12) United States Patent
Muanchart

(10) Patent No.: US 10,667,472 B2
(45) Date of Patent: Jun. 2, 2020

(54) AIR MOVEMENT CONTROL AND AIR SOURCE DEVICE FOR CULTIVATION

(71) Applicant: Mankaew Muanchart, Muang Surin (TH)

(72) Inventor: Mankaew Muanchart, Muang Surin (TH)

(*) Notice: Subject to any disclaimer, the term of this patent is extended or adjusted under 35 U.S.C. 154(b) by 0 days.

(21) Appl. No.: 16/470,123

(22) PCT Filed: Nov. 17, 2017

(86) PCT No.: PCT/TH2017/000082
§ 371 (c)(1),
(2) Date: Jun. 14, 2019

(87) PCT Pub. No.: WO2018/111203
PCT Pub. Date: Jun. 21, 2018

(65) Prior Publication Data
US 2019/0357451 A1    Nov. 28, 2019

(30) Foreign Application Priority Data
Dec. 14, 2016 (TH) .............................. 1601007444

(51) Int. Cl.
*A01G 9/24* (2006.01)
*A01G 7/02* (2006.01)
*A01G 9/18* (2006.01)

(52) U.S. Cl.
CPC .............. *A01G 9/246* (2013.01); *A01G 7/02* (2013.01); *A01G 9/18* (2013.01)

(58) Field of Classification Search
CPC ........... A01G 9/025; A01G 9/246; A01G 9/24
See application file for complete search history.

(56) References Cited

U.S. PATENT DOCUMENTS 4,196,544 A * 4/1980 Davis .................... A01G 7/045
                                                     47/17
4,218,847 A * 8/1980 Leroux .................. A01G 31/06
                                                     47/59 R
(Continued)

FOREIGN PATENT DOCUMENTS

CN    201479679 U    5/2010
CN    201700204 U    1/2011
(Continued)

OTHER PUBLICATIONS

International Search Report and Written Opinion for related International Application No. PCT/TH2017/000082, dated May 22, 2018; 9 pages.

*Primary Examiner* — Magdalena Topolski
*Assistant Examiner* — Morgan T Barlow
(74) *Attorney, Agent, or Firm* — Procopio, Cory, Hargreaves & Savitch LLP

(57) ABSTRACT

A system for mixing gases affecting the growth of plants (such as carbon dioxide) with returned extracted gases, refrigerating and introducing the mixed gases (via an air-moving device) into a space containing cultivated plants, and maintaining movement the mixed gases over the plants and then away from them is provided. As the mixed gases move over the plants, the mixture interacts with the plants, gathering emitted gaseous and vapor photosynthesis products from the plants. The movement of the mixed gases, which can be assisted by additional devices, transports emitted photosynthesis products away from the plants and towards a region of the spatial volume where these can be removed for subsequent processing, reintroduction, and/or storage. Processing can include moisture capture and liquid/gas separation. In an embodiment, separated mixed gases can be re-introduced into the spatial volume by the air- (Continued)

moving device, and separated liquid can be provided to the plants for nutrition.

21 Claims, 6 Drawing Sheets

(56) References Cited

U.S. PATENT DOCUMENTS

| | | | | | |
|---|---|---|---|---|---|
| 4,219,008 | A | * | 8/1980 | Schultz | A01G 9/243 126/592 |
| 4,332,105 | A | * | 6/1982 | Nir | A01G 31/02 137/563 |
| 4,609,346 | A | * | 9/1986 | Siccardi | A01G 9/246 432/222 |
| 4,742,475 | A | * | 5/1988 | Kaiser | A01G 9/26 700/278 |
| 5,101,593 | A | * | 4/1992 | Bhatt | A01G 9/16 47/17 |
| 5,249,430 | A | * | 10/1993 | Assaf | A01G 9/246 62/94 |
| 5,279,609 | A | * | 1/1994 | Meckler | F24F 3/00 236/49.3 |
| 5,315,834 | A | * | 5/1994 | Garunts | A61L 9/00 62/78 |
| 5,713,154 | A | * | 2/1998 | Goldstein | A01G 9/18 47/17 |
| 5,746,653 | A | * | 5/1998 | Palmer | F24F 7/025 454/186 |
| 5,813,168 | A | * | 9/1998 | Clendening | A01G 9/246 47/17 |
| 6,230,437 | B1 | * | 5/2001 | Wolverton | A47G 7/041 47/39 |
| 6,446,385 | B1 | * | 9/2002 | Crutcher | A01G 9/18 47/17 |
| 6,727,091 | B2 | * | 4/2004 | Darlington | B01D 53/85 435/299.1 |
| 7,243,460 | B2 | * | 7/2007 | Darlington | A01G 31/02 47/59 S |
| 7,832,144 | B2 | * | 11/2010 | Corradi | A01G 31/02 47/59 S |
| 8,453,470 | B2 | * | 6/2013 | Arbel | A01G 9/246 62/93 |
| 8,516,743 | B1 | * | 8/2013 | Giacomantonio | A01G 31/02 47/62 A |
| 8,578,651 | B1 | * | 11/2013 | Giacomantonio | A01G 31/02 47/59 R |
| 8,910,419 | B1 | * | 12/2014 | Oberst | A01G 31/06 47/60 |
| 9,032,665 | B2 | * | 5/2015 | Whitney | A01G 31/02 47/59 R |
| 9,220,207 | B2 | * | 12/2015 | Storey | A01G 31/06 |
| 9,445,557 | B2 | * | 9/2016 | Darlington | A01G 31/02 |
| 9,462,755 | B1 | * | 10/2016 | Coraggio | A01G 9/025 |
| 10,390,496 | B2 | * | 8/2019 | Carson | A01G 9/22 |
| 2003/0188477 | A1 | * | 10/2003 | Pasternak | A01G 9/246 47/17 |
| 2008/0044892 | A1 | * | 2/2008 | Wu | B01D 53/84 435/292.1 |
| 2008/0087165 | A1 | * | 4/2008 | Wright | B01D 53/04 95/51 |
| 2010/0257781 | A1 | * | 10/2010 | Batty | B01D 53/1456 47/1.4 |
| 2010/0257878 | A1 | * | 10/2010 | Arbel | A01G 9/246 62/93 |
| 2010/0275512 | A1 | * | 11/2010 | Nien | A01G 9/16 47/66.7 |
| 2011/0154985 | A1 | * | 6/2011 | Mittelmark | A01G 27/00 95/1 |
| 2011/0192082 | A1 | * | 8/2011 | Uchiyama | A01G 9/24 47/66.6 |
| 2013/0055893 | A1 | * | 3/2013 | Lowe | A01G 9/246 95/92 |
| 2013/0118070 | A1 | * | 5/2013 | Marquez | A01G 9/02 47/66.6 |
| 2013/0160363 | A1 | * | 6/2013 | Whitney | A01G 31/02 47/59 S |
| 2014/0196880 | A1 | * | 7/2014 | Pinchuk | A01G 9/246 165/222 |
| 2014/0318011 | A1 | * | 10/2014 | Jarvinen | A01G 9/025 47/79 |
| 2015/0237811 | A1 | * | 8/2015 | Marquez | A01G 9/023 47/66.6 |
| 2015/0264871 | A1 | * | 9/2015 | Finnerty | A01G 9/18 47/62 A |
| 2015/0289452 | A1 | * | 10/2015 | Axley | F28C 3/06 47/66.6 |
| 2016/0286737 | A1 | * | 10/2016 | Kisting | A01G 9/246 |
| 2017/0273256 | A1 | * | 9/2017 | Hutzel | B01D 53/84 |
| 2018/0054985 | A1 | * | 3/2018 | Li | A01G 31/02 |
| 2018/0184602 | A1 | * | 7/2018 | Ofir | A01G 9/20 |
| 2018/0235155 | A1 | * | 8/2018 | Funamori | A01G 7/04 |
| 2018/0242539 | A1 | * | 8/2018 | Bhattacharya | A01G 7/045 |
| 2018/0263194 | A1 | * | 9/2018 | Pilebro | A01G 9/243 |
| 2019/0029189 | A1 | * | 1/2019 | Maki | A01G 9/20 |
| 2019/0261587 | A1 | * | 8/2019 | Abe | A01G 9/246 |
| 2019/0289803 | A1 | * | 9/2019 | Gagne | A01G 9/247 |

FOREIGN PATENT DOCUMENTS

| | | | |
|---|---|---|---|
| CN | 202489019 U | 10/2012 | |
| CN | 102939871 A | 2/2013 | |
| CN | 203167709 U | 9/2013 | |
| CN | 203313826 U | 12/2013 | |
| CN | 204513637 U | 7/2015 | |
| DE | 3310382 C1 * | 10/1984 | A01G 9/246 |
| DE | 202011109100 U1 * | 2/2012 | A01G 9/025 |
| EP | 3039958 A1 * | 7/2016 | A01G 9/246 |
| FR | 2498050 A1 * | 7/1982 | A01G 9/246 |
| JP | 2011015655 A | 1/2011 | |
| JP | 2012000028 A | 1/2012 | |
| JP | 2016054713 A | 4/2016 | |
| WO | WO-2011117437 A1 * | 9/2011 | A01G 9/025 |
| ZA | 200803785 B | 4/2009 | |

* cited by examiner

AIR MOVEMENT CONTROL AND AIR SOURCE DEVICE FOR CULTIVATION

CROSS-REFERENCE TO RELATED APPLICATIONS

This application is a U.S. National Stage entry of PCT Application No: PCT/TH2017/00082 filed Nov. 17, 2017, which claims priority to Thai Patent Application No. 1601007444, filed Dec. 14, 2016, the contents of which are incorporated herein by reference.

TECHNICAL FIELD

The present invention relates to agriculture and engineering, plant cultivation, and, in particular, air movement control and air velocity retention devices directed to plant cultivation.

BACKGROUND

Air movement involves air moving from one place to another. There are two types of air movement:
1. Wind, referring to the movement of air in the horizontal direction. It causes the distribution of air to the locations of the earth.
2. Air current, referring to the movement of air in the perpendicular (vertical) direction. It is involved in the formation of clouds, rain, drought, etc.

Wind is an important factor for plant growth. In addition to helping to pollinate crops and distribute seeds, wind also plays an important role in the growth of plants, helping to carry carbon dioxide for photosynthesis. The movement of water vapor, the other gases and temperature affect the photosynthesis process, making the process occur faster. A plant growing in areas where the wind blows lightly may be compared to a plant-growing area of wind blows with speed of 1-5 mph. The rate of growth is better to plant in area with light wind, especially the growth of the stem and roots of plants. There are also disadvantages, such as when a strong wind will causes the crop to blow down, loss of a crop, destruction of soil fertility, or is an obstacle a chemical spray.

The patent No. ZA 200803785 B describes methods and tools to control the air flow moving through a plant such as a tree, which can be applied to crops. Further, control the airflow through various parts of a plant is described.

The patent No. CN204513637 of Shanghai Yizhuo Energy Technology Co., Ltd. provides a synthetic weather system that includes air purifiers, fans, boxes, and a container-based acreage-controlled environment. A fan inflates airflow pressure into a container through a plant nutrient (e.g., culture medium), located at the roots of the plant. An aerator is used to solve the problem of pollution from a container-based crop acreage-controlled environment. This approach offers low power consumption and uses less space as well.

The patent No. JP2013111072 of Dyna Air KK describes the system and methods of air conditioning to controlled temperature of a plant's growth system and wind. By blowing air from the side of the plant to air through the top, air flows out in the perpendicular (e.g., vertical) direction to the imported air, to solve the problem of temperature control of the plant.

Patent No. JP201200028 of Shimizu Corp. (Shimizu Corp.) reveals that the presence of carbon dioxide in the air helps plant growth. The invention provides a fan in two key positions, one to assist in controlling the wind (the fan in the ventilation duct adjacent to the root of the plant), and another fan in a plant compartment for ventilating by blowing air back into an intake tube.

In searching the literature, we only find the winds control for plant growing system. There are no relevant inventions related to the use of air currents in the plant growing system.

Planting under conditions of a controlled wind is another factor that helps plants grow faster, but often presents problems in controlling the wind in a stable manner across an entire planting area. It is also difficult to stabilize the temperature distribution over an entire planting area. As a result, the quality of plants is not equal. The plants near the wind generator grow better than the plants that are farther away. Occasionally, plants in some areas are dwarfed or die. The planters solve the problem by planting the plant only in the area of stabilized wind. This limits the growing area to less than it should be and reduces its commercial output. Another problem is plants that grow vertically. In passive closed systems, plants on an upper-level plant shelf grow less than the plants on the lowest level even though they are provided the same nutrition and light because carbon dioxide, the key gas in photosynthesis, moves downward due to its density.

SUMMARY OF THE INVENTION

According to an aspect of the present invention there is provided an air movement control and air source device.

The air movement control includes a fixed installation of an air velocity retention device (AVRD), or an air source device for cultivation, or both. A process of picking up carbon dioxide and products resulting from the photosynthesis process by the movement of air through an area that cropping at a steady speed provides constant temperature and high carbon dioxide concentration throughout the planted area. This provides a solution to the problem of vertical cropping, which have a distribution of carbon dioxide that is dense at the bottom of the vertically-oriented crop rail (931), causing crops at the top growing area to not be as good as the crops situated further vertically below.

BRIEF DESCRIPTION OF THE DRAWINGS

An embodiment, incorporating all aspect of the invention, will now be described by way of example only with reference to the accompanying drawing in which.

DETAILED DESCRIPTION

An "air velocity retention device" or "AVRD" refers to a device that reduces or increases the speed of air movement. It has the ability to control the direction of air movement by install fans with propellers or bladeless fan. For example, the speed at which device passes is equal to, or close to, the speed of movement of the air that the grower sets for each crop.

A "crop rail" refers to a support for small containers used for planting crops. The crop rail may be a long unitary structure, can separate into pieces, or can be separate and put them together.

A "plane" refers to an area that comprises a line with at least 2 points and can be drawn straight. If there is any object or material placed on the line passing through the plane, it can be dragged to any point along a line. In this case it will be said that such objects or materials are on the same plane.

The definition of "air movement" refers to the movement of air from one place to another place. In the present application, we describe two types of air movement: wind and air current. It is also noted that the movement of air can occur in an angle which not horizontal and not vertical (e.g., not perpendicular to horizontal).

Air current is typically the movement of otherwise dormant air by convection. It may be naturally caused by the temperature of a lower region being hotter than temperature of an upper region. The hot air rises, and the cold air moves to replace it. This causes the distribution and circulation of wind that can affect the growth of plants. Because plants use carbon dioxide to photosynthesize, winds blowing in the horizontal direction will help photosynthesis proceed faster. Carbon dioxide from the plant and the photosynthetic oxygen is removed from the leaf area faster when the wind is maintained and cover the plants with cold air.

A natural phenomenon that occurs is when the wind is strong, an air current in the wind's path becomes turbulent. From mathematical knowledge, the velocity of motion may be represented as a vector, with the speed of motion of the air represented by the size of the vector and the direction of the air flow represented by the direction of the vector. So the importantly direction of air movement is not just only speed. In different locations, the velocity of motion can rapidly shift to a different vector.

In the case of air movement, the movement of air in each direction is not just named by the direction of the moving air but also associated with a different vector clearly distinguishing winds and air currents as being completely different.

According to an aspect of the present invention, air movement control and an air source device for cultivation is described as a part of a process comprising the movement of air over crops.

Figure 1:
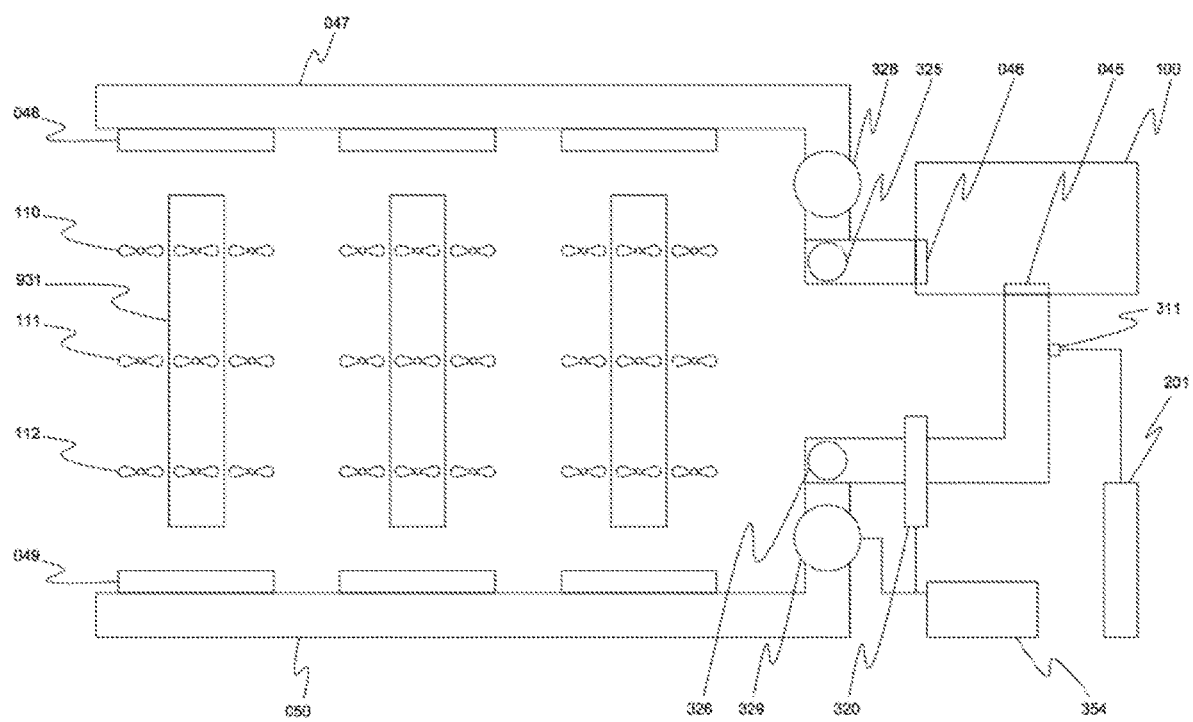
FIG. 1 is the block diagram of a plant cultivation in accordance with an embodiment of the system.
Figure 2:
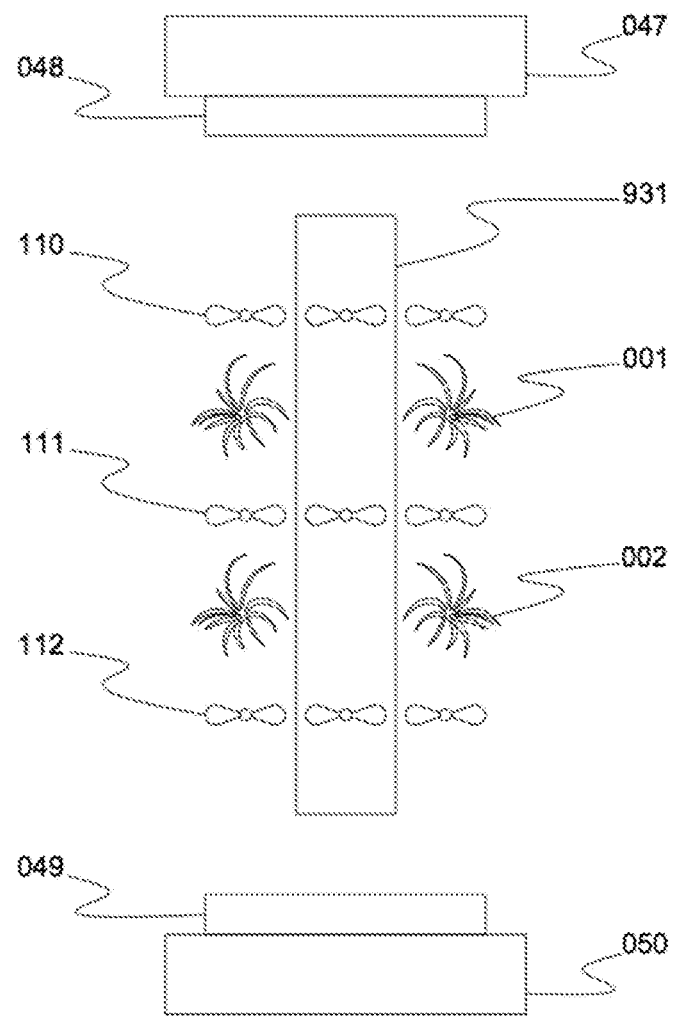
FIG. 2 is the drawing of the crop rail (931) with plants and air velocity retention devices for air movement regulation.

The operation of air source devices as shown in FIGS. 1 and 2 can be described as follows. First, gas that is used for photosynthesis of plants is brought from a gas storage tank (201). The gas travels through a gas nozzle (311) to inject air into the air inlet (045) to supply air to the air conditioner (100), which regulates the air temperature to a temperature used to grow crops. Then the air is released through the air outlet of the air conditioner (046) through the air inlet accelerator (325). The air enters the air collector tube (328) and distributes air into the discharge pipe (047), which releases the air to the emission point (048), and scatters it to various points in a controlled way. When the air is released from the emission point (048), then the air is passed to a first AVRD (110) through a first plant (001) and then through a second AVRD (111) through a second plant (002) respectively and continuing through the available stages of the crops by installing equipment to maintain the speed of the movement air that are spaced at a constant speed movement of air. When air passes through the plant, it is sucked through the air intake (049) and flow into the pipe (050). That which is being sucked into the pipe (050) is the air, gases, water, and solutions formed by photosynthesis of the plant, and it is conveyed to the collecting pipe (329). It is then separated and conveyed into a two-state product: gas and liquid. Liquid products and the solution water enters into the solution tank (354). The products in a gas state enter into the air aspirator (326) and then goes to the excess moisture trap (320). The excess moisture trap (320) works as a moisture trap and separates the product into two states: Gas and liquid. The liquid can flow to the storage tank (354) for use in plant nutrient processing. The gas can flow to the gas nozzle (311) to combine with the gas being dispensed from the gas storage tank (201).

Figure 3:
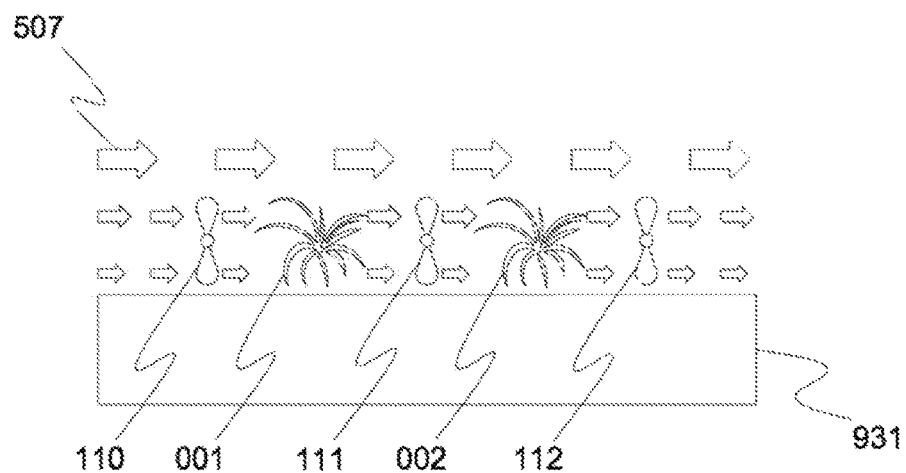
FIG. 3 is an alternate version of FIG. 2 in accordance with an embodiment with a dynamic illustration of the direction air movement.

The work of air movement is continued by the devices that create air movement, as shown in FIG. 3. The operation can be explained as follows. As shown in FIG. 2, air released from the discharge point (048) is directed to an AVRD (110) in the trajectory of the air (507) flow is used to maintain a constant speed of air flow. An optimum speed may be 0.1 to 5 meters per second, but the optimum velocity depends on the growth stage of the plant, which is divided into three phases. The first stage is a seed stage. The seed stage is the embryonic axis and attaching cotyledon, and has a radicle that is ready to grow to the plant root. The second stage is the seedling stage, which is the distance from the seed stage until the plant has 3-4 leaves. The roots of the plant are longer than first stage. The third stage is the growth stage, which is the distance from the seedling stage until the plant is ready for harvest. The speed of air movement to the cultivated plant will affect the plant growth in the seedlings and growing stages. An optimal speed for drought tolerant plants is 0.3 meter per second. The optimal speed for growing plants is 1 meter per second. The air flows through the plant (001) and carries carry carbon dioxide to plant for use in photosynthesis. An optimum carbon dioxide concentrated for equipment is 450 to 1600 parts per million (ppm), while a best suitable carbon dioxide concentration is 500 to 1000 parts per million parts. At the same time that the air passes the carbon dioxide through plants, it will also blow products from photosynthesis of previous plants, such as oxygen and water vapor, and especially single molecular sugars used for plant growth (001). When the air blows through the area with a lot of plant photosynthesis, the plants will be able to synthesize photosynthesis faster than the air that passes through fewer or no plants.

At the same time, the air movement from the air source device in the process is shown in FIG. 3 as from the air conditioner (100). The air is cool enough for planting crops. The air acts to spread the cold and transfer heat to the growing area better. When the air move to the plant (001), the air passes through an unobstructed area and the speed decreased. The air velocity retention device AVRD (111) works as to speed up and give direction of the air to the plant (002). When the air moves into the plant (002) and passes through an unobstructed area, the speed is speeded up to normally by the AVRD (112). The air is drawn into the air outlet (049) and flow into the air movement device described earlier.

To meaningfully measure carbon dioxide and the other gases that affected the plant growth, measurement is made in the planting compartments (e.g., where the plants grow).

These measurements may be made in two ways: automatic measurement and measure with a device that uses by data collector. We can do either or both.

An air source device for the present application may have the following characteristics:

1. The AVRD maintains the speed of the movement air in a cross-sectional area that can maintain a reasonable speed of 5 to 15,000 square centimeters, depending on the growing stage of the plant. The optimal cross-section area for the seedlings can be 10-100 cm. The optimal cross-section area for most growing plants is 10000 to 13000 square centimeters.

2. The distance between consecutive in-line AVRDs that keep the air velocity in the same plane in line may be 15 to 300 centimeters. The air velocity depends on the selected cross-sectional area that can keep the speed correlated with distance by using either one or both of engineering calculations or experimental installation and use of speed measuring velocity. In this way, the grower may control the speed of air for the growth stage of the crop. In the planted seedling stage, the air movement can maintain the speed appropriately in a range of 0.01 to 1 meter per second. The optimal speed is 0.1 to 0.7 meters per second. In growth stage, the grower can control the optimum range to be between 0.3 to 6 meters per second. The optimal speed is 0.3 to 5 meters per second.

3. Each AVRD can be installed between plants or the plants can be placed between the pairs of AVRDs to maintain air velocity. Either or both of these approaches may be used. An appropriate approach can be to install air velocity bladeless fan, air handling equipment and place plants in between consecutive pairs of AVRDs.

4. The gas storage tank (201) can be designed to have characteristics suitable for storing carbon dioxide ($CO_2$). The main gas is imported into the device can be used to create the movement of air. This can depend on the choice whether to store carbon dioxide gas or liquid, which are packaged in a pressure-resistant container as follows. Carbon dioxide cylinders are contained in high pressure $CO_2$ cylinders. Liquid carbon dioxide is stored in a pressure-resistant container under temperature control, controlling the temperature to be between −180 degrees Fahrenheit or 0 degrees Celsius (low pressure $CO_2$ tank).

5. The air conditioning device (100) adjusts the air temperature to a desired value. The air conditioner may be used as part of an air movement device, and can adjust the optimum temperature to be between 5 to 50 degrees Celsius and can adjust the optimal temperature to be between 15 to 45 degrees Celsius.

6. The air blower (325) and the air acceleration device (326) are characterized by causing the movement of air with the desired speed and desired direction. This can be achieved by rotating the propeller centrifugal force causes a liquid or air to flow along the circumferential direction. Or the air flow along the axial line into the air intake behind the propeller fan and flow through an axial fan. The device is appropriately operated as the air blower (325) and/or the air accelerator device (326). The most suitable equipment used to work as the air blower (325) and an air acceleration device (326) is a centrifugal pump. Any devices that have a speed boosting behavior, which can cause airflow or exhaust can also be used as the air blower (325) and as the air acceleration device (326) within the concept and scope of this invention.

7. The air discharge tube (047) and pipe (050) work as the passage of the airflow. It is noted that the passage of air used for crops that does not require much pressure. Also it is noted that is no corrosion from what it passes. Therefore, it is possible to employ recyclable materials and replace them. The suitable manufactured materials may include aluminum, plastic, stainless steel and foil.

8. The air collector tube (328) works to collect air from distributed intakes to a single location before releasing air to the air discharge tube (047), then the air ventilates to the emission point (048) at all emission points. So that the air from each emission point (048) has the same constant velocity, the most suitable material is aluminum, plastic, stainless steel, and the most suitable material is plastic. The surface area of the air collector tube (328) may be from 19 to 6360 square centimeters. The optimum cross sectional area of the air collector tube (328) may be from 120 to 1110 square centimeters.

9. The compilation pipe (329) collects air from the pipe (050) that receives air from the air intake (049) at each point of air entry that does not have the same pressure. Then, the air moves through the pipe (050) and is collected at the compilation pipe (329) for constant pressure storage. The air release portion of the compilation pipe (329) can shape many aspects to suit each application area. The suitable manufactured materials may include aluminum, plastic, stainless steel, and the most suitable material is plastic. The size of the air compilation pipe (329) may be from 19 to 6360 square centimeters. The optimum area of the air compilation pipe (329) may be from 120 to 1110 square centimeters.

10. The air compilation pipe (329) collects air from a pipe (050) that receives air from the air intake (049) at each point of air entry that does not have the same pressure. Then, the air moves through the pipe (050) and is collected at the air compilation pipe (329) for constant pressure storage. The air release portion of the air compilation pipe (329) can shape many aspects to suit each application area. The suitable manufactured materials may include aluminum, plastic, stainless steel, and the most suitable material is plastic. The size of the air compilation pipe (329) may be from 19 to 6360 square centimeters. The optimum area of the air compilation pipe (329) may be from 120 to 1110 square centimeters.

11. The solution storage tank (354) can store photosynthetic products in form of liquid. It can comprise a closed container which has a two way passage and one outlet, and store a liquid obtained from the collecting pipes (329). The liquid passing from the excess moisture trap (320) and the solution outlet are removed. It can be injected into the plant nutrient process.

12. The excess moisture trap (320) is a device that works to trap excess moisture from the air and separates the water and air. There present application may include many types of mechanical refrigeration, desiccant dehumidifier, air filter, humidity control unit and other types of elements. The excess moisture trap (320) may comprise a desiccant dehumidifier, an air filter and a humidity control unit.

13. The crop rail (931) is used to hold growing plants. The special characteristics of crop rail (931) are only limited to use with the air source device and the described process of air movement. The crop rail (931) can be both horizontal and/or vertical. The use of crop rail for the air source device preferably is:

1. Made of the suitable materials such as Polyvinyl Chloride, Polyethylene, Polypropylene, 316L stainless steel, 304 stainless steel and 308 stainless steel.

2. Has a color on the exterior surface that gives the density of photosynthetic photon flux density (PPFD) in the range of 100-1000 microns per square meter per second (micron mol/m$^2$-sec).

3. Has a textured surface as touched by hand or visible to eyes.

4. Has a shape allowing plants to be vertically stacked or adjacently placed horizontally.

14. Any device that can remove air from the air intake (049) and flow through the air collector tube (328) can be added. Any such added device can be viewed as one of the components of the air acceleration device (326).

15. The present application provides for aerial movement devices to be provided to the horizontal crop rails (931) so as to reduce the installation process of the air velocity retention devices.

The concept and scope of the present application provides for modification of the various inventive steps and reorganizing parts of the device, for example, switching positions. The process of creating the air movement for the present application is explained. The air direction vector is determined by where the air emission (048) and the air outlet point (049) are installed. The effect of these two mounting positions for the effective of the growth of plants are compared in FIG. 4.

Figures 4A, 4B, 4C:
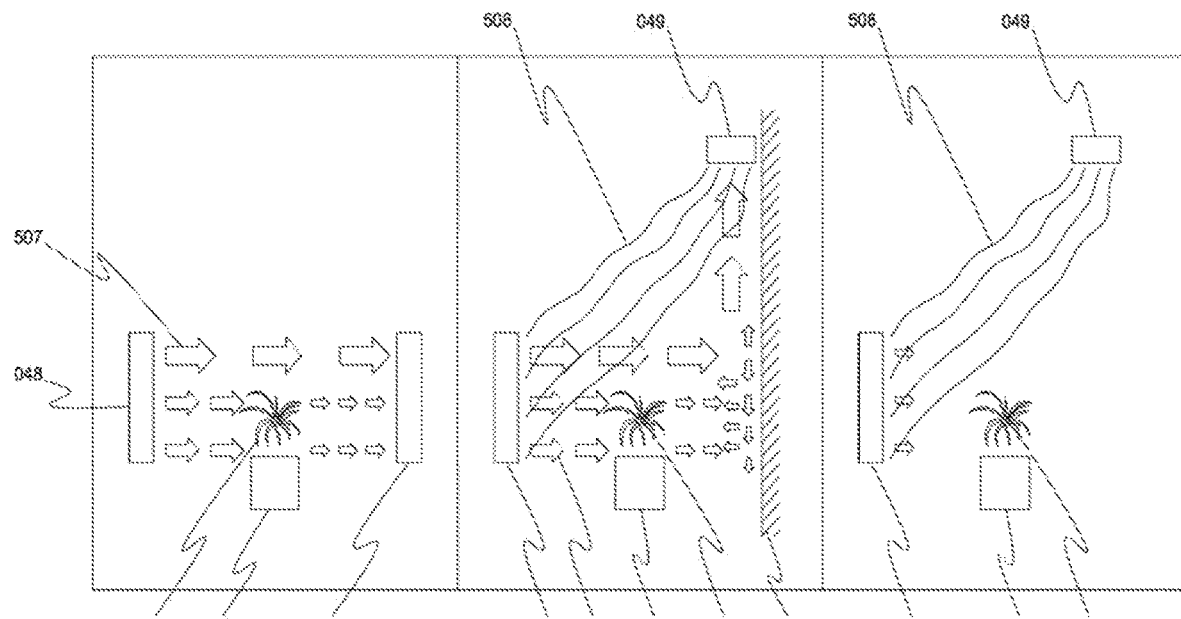
FIGS. 4A-4C are illustrations comparing the air movement at the emission point (048) and the air intake (049) of each environment.

FIG. 4 shows a division into three separate compartments, for example, left (FIG. 4A), middle (FIG. 4B) and right compartments (FIG. 4C), respectively. These three cases are now considered.

The left hand compartment shows the air emission point (048), the air intake (049) and the plant (001) in the same plane. Air from the air emission point (048) is released. The aerial movement (507) is directed straight to the plant (001), which is planted on the crop rail (931). That cause the speed decrease and the air move into the air intake (049), respectively. If we increase the suction pressure to the air intake (049), the air will move faster.

The middle compartment shows the air emission point (048), the air intake (049) and the plant (001) which are in the same plane. When the air is released from the air emission point (048), it represents the air movement path (507) and (508). The air movement path (507) moves through the plants (001) planted on the crop rails (931) that cause the speed decreases and move to the wall (503), and cause some change to the direction of the movement flow to the exhaust point. Some air flows in opposite directions to the air intake (049) which cause the air distributed and flow back. If the installation of the air intake (049) is in a different direction from the air emission point (048) and the plant (001), some air is suck into the air intake (049) that make a path of air movement (508). When the path of air movement is raised, the force of the movement of air move into the plant (001) is less than in the left compartment.

The right compartment shows the air emission point (048) placed in different planes from the suction point (504) and the plant (001). When the air is released from the air emission (048), the air is sucked to the air movement path (508) to make another path of air movement (507). The air pressure is less at some areas of the plant (001) and some area the air do not move through. The right compartment illustrates a case where the installation is made at an improper distance, causing the movement of air to the plant (001) to be very low if any. In this case, the plant (001) may fail to grow at full rate because the air movement is not adequate for growth.

| Comparison | Left-hand Compartment | Middle Compartment | Right-hand Compartment |
|---|---|---|---|
| Increasing the suction in the air intake. | Can do both ways | Do not increase the suction | Increase the suction |
| Air movement characteristics | Moves from the point of air emission outlet through the plant in the same plane line | Scattered when move into the wall. | Moves from the air emission to the air outlet point in straight line and some paths do not pass through plants. |
| Movement through plants | thorough | thorough | Not thorough |
| Size or pressure of air movement when hit plants. | most | Less than the left compartment. | Less than the left and middle compartments, and sometimes does not pass the plants. |
| When the movement of air from the air emission point increases. | The plant is fully replenished and provides exhaust air at the suction point rapidly. | The plant has been fully replenished, and the direction of motion diffuses and scatters when impacting the wall; the suction point that cause it to be drawn in more slowly because of the impact directions on the wall. | In the area where the air move through the plants is not adequately replenished. |
| Operation of carbon dioxide and oxygen in photosynthesis process | Carbon dioxide flow to the photosynthetic area of plants and quickly exchanges with oxygen from that area. | Oxygen and carbon dioxide diffuse on the wall and is scattered; some oxygen moves back to area that carbon dioxide in the photosynthesis process which cause the plant to not grow as fully. | As there is no air movement in the plant area, plants do not use carbon dioxide from the air emission point, and instead uses carbon dioxide within the closed compartment. This is the same process as regular crop growing without using and equiptment. |

From the above comparison table, we will see that: The control of air movement affects the plant growth; Optimal control method is to control the direction of all air movement in the same direction; and By placing or installing both the air emission point (048) and the air intake (049) which are in the same line or plane as to the plant (001), different results are obtained.

The control of air movement in the same direction is divided into three types: horizontal, vertical and tilted. As discussed earlier, the horizontal movement is referred to as wind, and the vertical movement is referred to as air current.

From now on, we will consider the same directional air movement for optimal cropping. Considering the crop rail (931) there are two orientations: horizontal and vertical. The crop rail (931) may be analyzed in various cases.

Figures 5A, 5B:
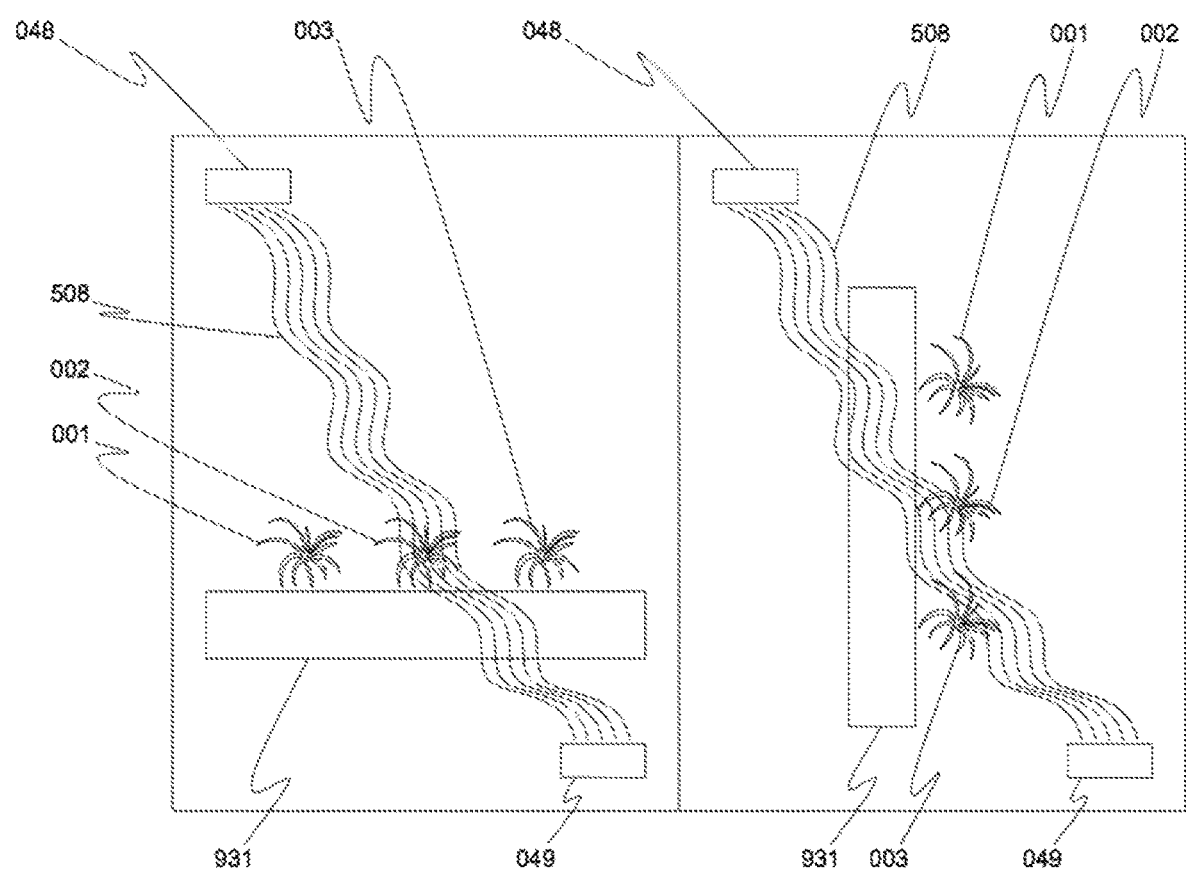
FIGS. 5A-5B are illustrations comparing the air movement on the crop rail (931) between vertical and horizontal cultivation wherein the air movement flows in a tilted direction.
Figures 6A, 6B:
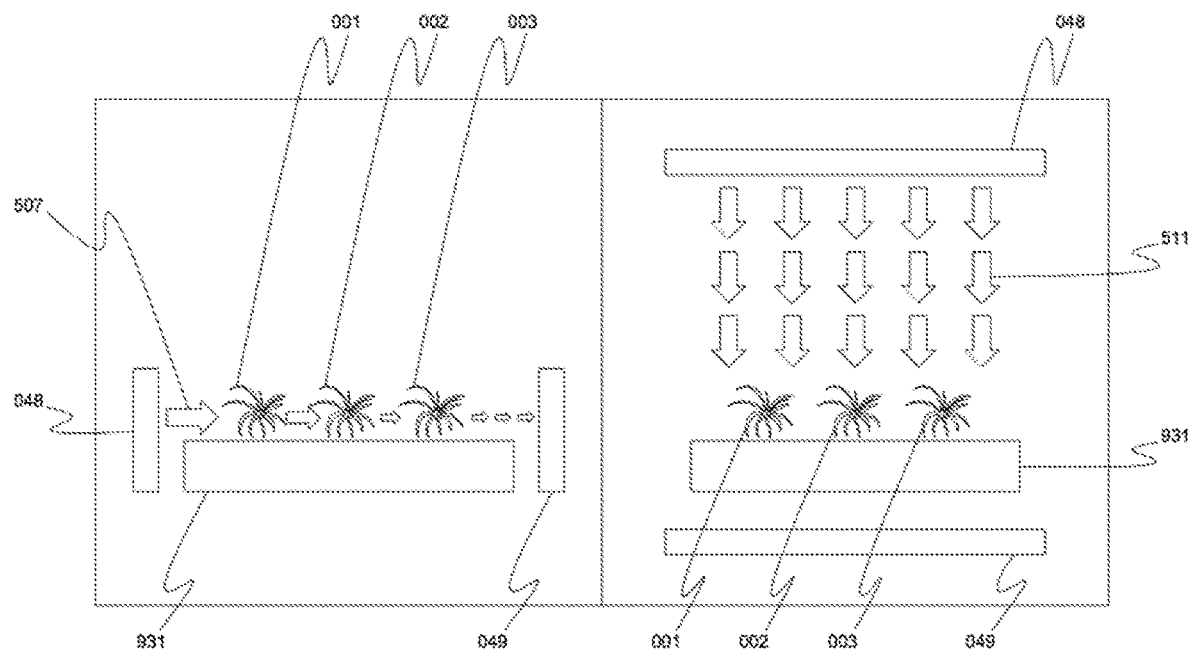
FIGS. 6A-6B are illustrations of the crop rail (931) comprising a horizontal direction, comparing between wind and air current types of air movement.
Figures 7A, 7B:
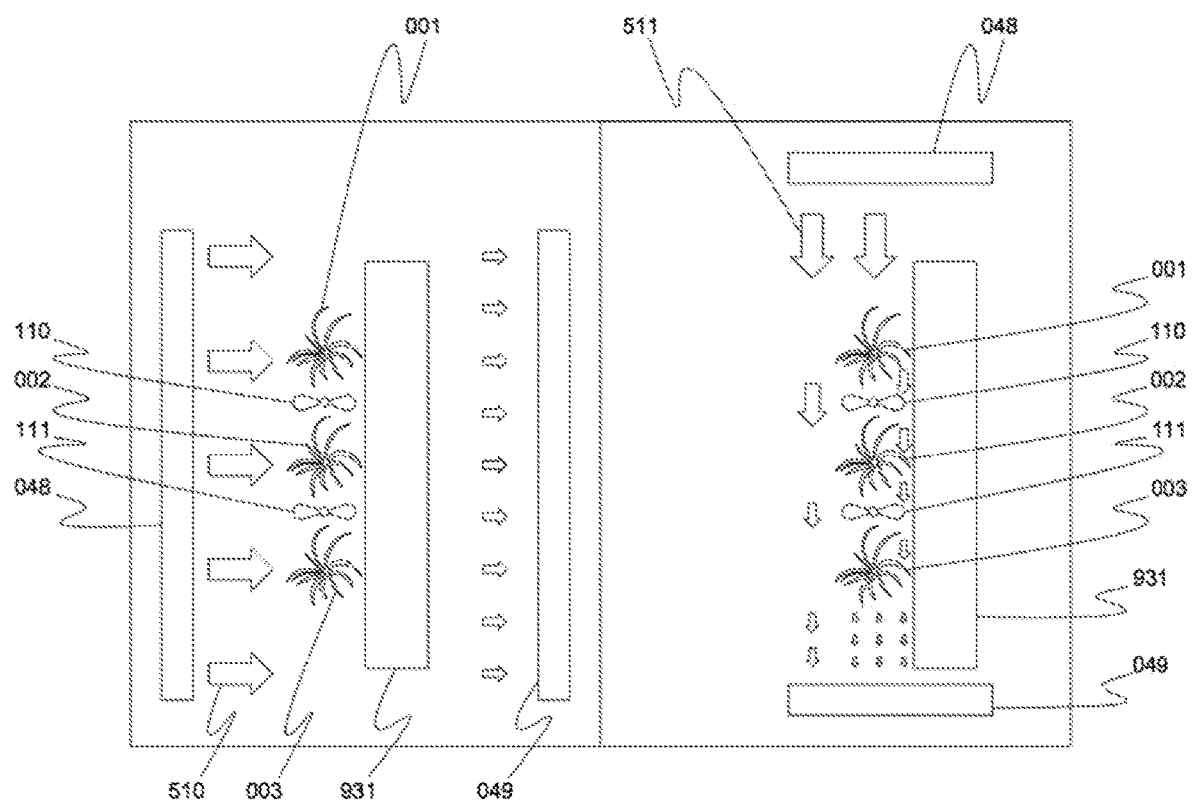
FIGS. 7A-7B are illustrations of the crop rail (931) comprising a vertical direction, comparing between wind and air current types of air movement.

Case 1: Considering the plant growing by the moving air in angle plane, as shown in FIG. 5. We divide the image to two compartments: a left (FIG. 5A) and right (FIG. 5B) compartment. As shown in the figure, the direction of air movement is in an angle (tilted) plane flowing from the air emission point (048) to the air intake (049). It can be seen that with either the horizontal or vertical crop rail (931), there is a problem with moving air through every plant. As shown in the picture of the left hand compartment, the horizontal crop rail (931) has the plant (001) and the plant (003) that are not in line with the movement of the air. Only the plant (002) is in same plane. As the picture on the right hand compartment shows, the vertical crop rail (931) has the plant (002) and the plants (003) that are partially in line with the movement of the air. By placing or installing the air emission point (048) and the air intake (049) in the same position as in the figure that used the space used for planting more than the space from controlling the direction of air movement in FIGS. 6 and 7.

Case 2: Considering the horizontal crop rail (931), as shown in FIG. 6, again divided to two compartments. The left hand compartment (FIG. 6A) shows the control air movement of wind. The right hand compartment (FIG. 6B) shows the control air movement of air current. In the left hand compartment, the air flow (510) from the air emission point (048) moves through plant (001), plant (002) and plant (003) respectively. The force of the airflow (510) is reduced when it passes from the plant (001) through the plant (002). The velocity of the air flow (510) is further decreased at the plant (003), because the airflow (510) pass through the plant (001) and plant (002) respectively. Then, the air flows to the air intake (049). In the right hand compartment, the air flows out of the air emission (048) located above. The movement of the airflow (511) moves to the area of plant (001), plant (002), and plant (003). Then the air is sucked into the air intake (049). By comparing the air movement with that in the horizontal crop rail (931), the controlled air current is better than the wind because all plants have constant air speed. While using the wind, the air speed will decrease.

Case 3: Considering the vertical crop rail (931), as shown in FIG. 7, which is again divided into two compartments. The left hand compartment (FIG. 7A) shows the direction of air movement in the wind. In the right hand compartment (FIG. 7B), the control direction of air movement is in the form of an air current. The explanation of the left hand compartment divides into two subcases. In the first subcase, there is no air movement control provided by AVRD (110) and AVRD (111). In the second subcase, air movement control is provided by AVRD (110), and AVRD (111). The first subcase is described below. The air flows out of the air emission point (048). The air flow (510) moves through the plant (001), the plant (002), and the plant (003), but then is obstructed by crop rail (931) before it can flow to the air intake (049). Vertical crops planting often uses at least one in line crop rail (931). If the crop rail (931) installations are spaced far apart, the airflow (510) is further reduced. So that the crop rail (931) near the air intake (049) have less the air flow (510). Carbon dioxide from the airflow (510), which could assist in photosynthesis by more rapid replacement of carbon dioxide and oxygen, is reduced. The temperature of the airflow (510) is also unevenly distributed. So a plant on the crop rail (931) that is far away from the air emission point (048) will grow worse, not grow at all, or may eventually die. In Case 3, use of the vertical crop rail (931) must consider the weight of gas unlike growing crops in horizontal. Carbon dioxide is heavier than oxygen, so making the emitted carbon dioxide flow to the bottom. The velocity of the airflow (510) help the carbon dioxide to be distributed horizontally. But when speed of the airflow (510) drops, carbon dioxide will gradually fall to the bottom of the crop rail (931). And when the height of the crop rail (931) increases, the planted area above will have less chance to grow, and plants on upper crop rails cannot grow. This is another major concern in crop planting.

The second subcase is described as follows. The airflow out of the air emission point (048) into the airflow (510) and flow through the plant (001), the plant (002), the plant (003), AVRD (110) and the crop rail (931) into the air intake (049). AVRD (110) and AVRD (111) operate to their installation characteristics. This can be installed in two ways: a wind installation or an air current installation. The wind installation keeps the velocity of the airflow (510) constantly, or close to the velocity of the airflow (510) from the air emission point (048), but this arrangement is very problematic because of obstruction from the wind, such as the crop rail (931). Such a system requires more energy and power to keep speed of the air flow constant. For a vertical crop rail (931) with at least one rail added, the velocity of the airflow (510) at the crop rail (931) drops down sequentially. The engineering calculations to install AVRD (110) and AVRD (111) device in each rail are unequal, and are difficult to produce. It also does not solve the problem of carbon dioxide flow down the bottom of the crop rail (931). The plants at the top of the crop rail (931) grow less or not grow at all. A second installation method, which work to create air current as the vertical air movement, keeps carbon dioxide flowing down gradually, and causes the carbon dioxide to float around the plant in plane. However, because the wind and the air current are perpendicular, this creates new force in that area which cause diffusion so that the replacement of carbon dioxide and oxygen does not work functionally, thus introducing a new problem. In addition, the installation does not solve the problem of the vertical crop rail (931), because this installation cannot carry the airflow (510) to flow through every crop rail (931) in the plant left hand compartment.

The right hand compartment shows the control of the air movement direction I the form of an air current. In the right hand compartment, which can be divided the explanation into two subcases: the first subcase describes the air movement without AVRD (110) and AVRD (111). In the second subcase, the air movements with AVRD (110) and AVRD (111) are described as follows. The air flows out of the air emission point (048) and form the air flow (511) which flows down through the plant (001), plant (002) and plant (003). Then the air flows into the air intake (049). In addition to the airflow (511), the speed at the air emission point (048) is set, and the proper temperature distribution is readily available for each type of plant to keep the temperature of the upper region cooler than the bottom region for creating the air currents naturally. So this makes the air movement stronger than the other plane. If the horizontal crop rail (931) is used, the effects may not be clearly noticeable because there is only one crop rail plane. For a crop rail (931) that is vertically oriented, the results are clear because it has the multiple crop rails. So when the crop is located very high, it uses less energy to generate air velocity than other cases because it involves a natural air current that increases the energy of air movement. In the air release process, the carbon dioxide is mixed for plant photosynthesis. The carbon dioxide is heavier than oxygen, so it flows down to the bottom. This causes the plants on the top crop rail (931) to grow less. At the higher crop rail (931), the plants experience less photosynthesis, even if the light is uniform, because the carbon dioxide needed for photosynthesis falls to lower levels.

The second subcase is described as follows. The air flows through the air emission point (048) in from the airflow (511) through the plant (001), AVRD (110), the plant (002), AVRD (111), the plant (003), and then finally to the air intake (049). This maintains the velocity of airflow (511) and keeps the collisions of carbon dioxide, causing it to slowly flow back to the top and make accelerated photosynthesis occur on every floor.

As indicated in Case 1, the appropriate air movement for planting is a combination of wind and air current. For Case 2, the optimal air movement for horizontal crop is the air current, because it does not require any additional equipment to solve the problem. For Case 3, the optimal air movement for a vertical crop is the air current is an unsolved problem but has less problem than the wind. And increasing the speed of air treatment equipment can solve the problem of maintaining the speed of air movement, temperature distribution and keeping the carbon dioxide density constant.

In summary, the process of creating air movement for planting has the following special characteristics.

1: Determine the direction of air movement to cover the growing area so that the air is moving around the plant stem to support photosynthesis and exchange carbon dioxide and oxygen by using the wind or the air current. Controlling the direction of air movement can be achieved by installing the position of an air velocity retention device (ACRD) so that the air flow from the air emission point (048) to the air intake (049) is in alignment with the air velocity retention device which is mounted on the crop rail (931) located perpendicularly and horizontally to the air emission point (048) and the air intake (049), or at an angle from the plane of the air emission point (048) and the air outlet point (049) that is less than or equal to 45 degrees. The most appropriate installation of the crop rail (931) is perpendicular to the plane of the air emission point (048) and the air intake (049).

2: Additional air velocity retention devices can be added in the same manner as may be needed and suitably coordinated with the crop rails.

3: When installed, the equipment should maintain air velocity and cause the direction of air movement to be in the same direction as the direction of air flow out of the air emission point (048).

Additionally, the process of creating the air movement control that is most suitable for planting may include:

1. Determine the direction of air movement that cover the crop area by using direction of air current. Inducing an angle in the direction of airflow can be achieved by the position of installed air source devices so as to be at least roughly aligned with the air flow from the air emission point (048) to the air intake (049). Further, install air velocity retention devices (AVRDs) on the crop rails perpendicular to the horizontal plane of the air emission (048) and the air intake (049), or at an angle to the path between the air emission point (048) and the air intake (049) that is less than or equal 45 degrees. The appropriate position for this is perpendicular to the plane line of the air emission point (048) and the air intake (049).

2. Additional air velocity retention devices may be added in the same manner, as may be needed and suitably coordinated with the crop rails.

3. Install AVRDs that maintain air velocity and cause the direction of air movement in the same direction as the direction of air flow out of the air emission point (048) and the air intake (049).

This concept and scope of the present application provides for the process of creating the air movement control applied to horizontal and vertical crop rail and can comprise more than one physical component.

The invention claimed is:

1. An air movement system for plant cultivation, the system comprising:
   a crop rail configured for holding plants;
   an air conditioner for the cooling of incoming air and producing cooled outgoing air, the outgoing air routed to an air emission point (048);
   a mixing arrangement for introducing stored gases into the incoming air;
   an air movement device for creating a flow of air movement of the outgoing air, further configured to direct the flow of air movement from the air emission point (048) to flow over an area of plants and arranged so that the flow of air movement traverses an essentially linear path from the air emission point (048) to an air intake (049);
   at least one air velocity retention device (AVRD) attached to the crop rail, each AVRD comprising . . . of each AVRD
   wherein the essentially linear path is arranged to traverse surfaces of at least one plant held in the crop rail, and
   wherein the at least one AVRD is oriented and arranged to assist the flow of air movement on the path from the air emission point (048) to the air intake (049).

2. The system of claim 1 wherein a plurality of AVRDs are attached to the crop rail, the plurality of AVRDs configured in a consecutive sequence so that air expelled from one of the AVRDs is directed towards the air intake of the next AVRD in the consecutive sequence.

3. The system of claim 2 wherein the AVRDs are spatially arranged in a consecutive sequence, and wherein the distance between consecutive AVRDs in the sequence is separated by a distance within a range of 15 to 300 centimeters.

4. The system of claim 2 wherein the crop rail is arranged to be able to hold at least one plant between a consecutive pair of AVRDs.

5. The system of claim 1, the system configured to implement an air movement control process comprising:
   retrieving at least one gas from a gas storage tank (201), the gas capable of affecting the growth of plants of plants,
   transferring the gas through a nozzle (311) to inject the gas into the airflow inlet (045) of the air conditioner (100), the air conditioner is configured to regulate the air temperature to be suitable for growing plants;
   directing the flow from an air outlet of the air conditioner (046) through the air inlet accelerator (325), wherein the air enters an air collector tube (328) for distributing air to a discharge pipe (047), which releases the moving air through the emission point (048) into a spatial volume comprising living plants;
   passing the moving air from the emission point (048) to a first AVRD (110) then through a region configured to comprise at least one plant (001) and into a second AVRD (111), then through a region configured to comprise at least plant (002), each AVRD is configured to maintain directed air movement;
   drawing the flow through the air intake (049), into the pipe (050), and to a collecting pipe (329);
   separating the flow into gas product and liquid product;
   directing the liquid product into a solution tank (354) wherein the liquid product stored in the storage tank (354) is available for use in plant nutrient processing; and
   directing the gas product into an air accelerator device (326) and subsequently to an excess moisture trap (320) for removing moisture from the gas product, and then directing the gas product to the air conditioner.

6. The system of claim 5 wherein the gas storage tank (201) comprises at least carbon dioxide gas.

7. The system of claim 5 wherein the solution storage tank (354) is a closed container comprising at least one passage and an outlet.

8. The system of claim 5 wherein the air inlet accelerator (325) comprises at least one of a centrifugal pump and an axial flow fan.

9. The system of claim 5 wherein at least one of the air discharge tube (047), the air collector tube (328), the collecting pipe (329), and the pipe (050) comprise at least one of aluminum, plastic, stainless steel, or foil, or equivalent.

10. The system of claim 5 wherein the surface area of the air collector tube (328) is within a range of 19 to 6360 square centimeters.

11. The system of claim 5 wherein the air conditioner provides an air temperature within the range of 5 to 50 degrees Celsius.

12. The system of claim 5 wherein the excess moisture trap (320) comprises at least one of a desiccant dehumidifier, an air filter, and a humidity control unit.

13. The system of claim 5 wherein the air accelerator device (326) comprises at least one of a centrifugal pump and an axial flow fan.

14. The system of claim 5 wherein the surface area of the collecting pipe (329) is within a range of 19 to 6360 square centimeters.

15. The system of claim 1 further comprising a measurement device configured to measure a concentration of gases that affect plant growth.

16. The system of claim 1 wherein the crop rail (931) has an exterior surface color comprising a photosynthetic photon flux density (PPFD) within the range of 100-1000 microns per square meter per second (micron mol/sqr·m·sec).

17. The system of claim 1 wherein the surface of the crop rail (931) comprises a textured surface.

18. The system of claim 1 wherein the crop rail (931) supports a plurality of plants in a vertical stack or in a horizontal array.

19. The system of claim 1 wherein the air movement velocity is essentially within a range of 0.1-5 meters per second.

20. The system of claim 1 wherein the carbon dioxide concentration in the outgoing air is in a range of 450 to 1600 parts per million (ppm).

21. The system of claim 1 wherein the crop rail (931) comprises at least one of Polyvinyl Chloride, Polyethylene, Polypropylene, 316L stainless steel, 304 stainless steel, 308 stainless steel.

* * * * *